United States Patent [19]

Schauder et al.

[11] Patent Number: 4,697,131
[45] Date of Patent: Sep. 29, 1987

[54] VOLTAGE SOURCE INVERTER AND VARIABLE FREQUENCY, CONSTANT VOLTAGE AC MOTOR DRIVE EMBODYING THE SAME

[75] Inventors: Colin D. Schauder; Theodore M. Heinrich, both of Murrysville Boro, Pa.

[73] Assignee: Westinghouse Electric Corp., Pittsburgh, Pa.

[21] Appl. No.: 807,569

[22] Filed: Dec. 11, 1985

[51] Int. Cl.$^4$ ............................................. H02P 3/20
[52] U.S. Cl. .................................... 318/762; 318/803; 318/764
[58] Field of Search ........................ 318/803, 807–811, 318/762–764; 363/135–138

[56] References Cited

U.S. PATENT DOCUMENTS

| | | | |
|---|---|---|---|
| 3,355,654 | 11/1987 | Risberg | 318/810 |
| 3,548,275 | 12/1970 | Inagaki et al. | 318/759 |
| 4,156,899 | 5/1979 | Matsuda et al. | 363/138 |
| 4,375,612 | 3/1983 | Wirth | 318/767 |
| 4,521,724 | 6/1985 | Sakamoto et al. | 318/762 |

Primary Examiner—David Smith, Jr.
Attorney, Agent, or Firm—C. M. Lorin

[57] ABSTRACT

A constant voltage voltage-source inverter of a motor drive includes in its DC-link the combination of diode means, a GTO device and an auxiliary thyristor, the GTO device and the auxiliary thyristor upon transferring to the regenerating mode being cyclically controlled for conduction concurrently with the thyristor of the AC/DC converter so as to match the (voltage-current) domains converter and input of the inverter. Conduction of the GTO device is interrupted before each cyclical control thereof to allow recovery.

Initiation of GTO and auxiliary thyristor conduction upon mode transfer is retarded to allow settling of the system before firing the thyristors of the AC/DC converter with a different firing angle.

9 Claims, 25 Drawing Figures

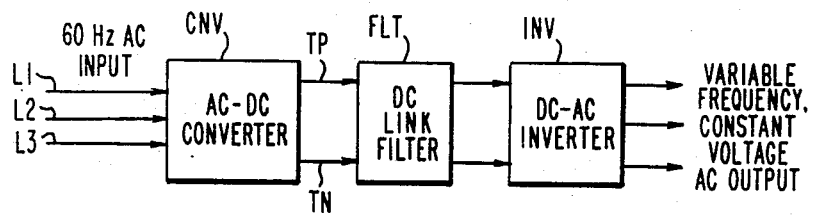
FIG. 1
PRIOR ART
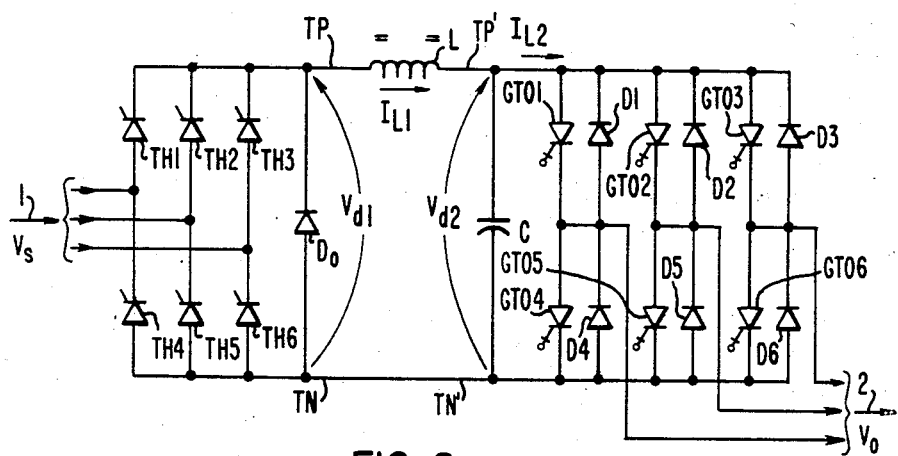
FIG. 2
PRIOR ART
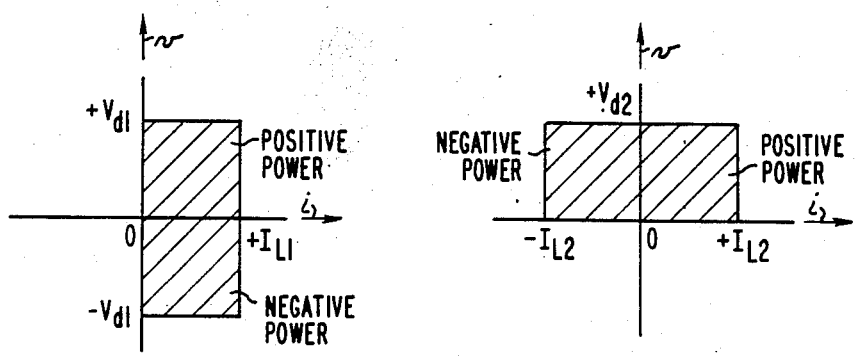
FIG. 4A
FIG. 4B

VOLTAGE SOURCE INVERTER AND VARIABLE FREQUENCY, CONSTANT VOLTAGE AC MOTOR DRIVE EMBODYING THE SAME

CROSS REFERENCE TO RELATED PATENT APPLICATION

The present patent application is related to concurrent patent application Ser. No. 807,568 now abandoned concurrently filed and entitled TWO-QUADRANT VOLTAGE-SOURCE CONVERTER AND FOUR-QUADRANT VOLTAGE-SOURCE INVERTER EMBODYING THE SAME. This cross-referenced patent application is hereby incorporated by reference.

BACKGROUND OF THE INVENTION

A voltage-source inverter includes an AC/DC converter supplying a DC voltage to the inverter through a DC-link including a capacitor and an inductance, as generally known. The AC/DC converter and the inverter are both generally in the form of a bridge including static power switches connected across the DC terminals and the AC lines.

Voltage-source inverters with a fixed voltage DC-link are increasingly being used in high performance motor drive applications. Typically, such motor drives operate through the four quadrants in terms of positive, or negative, current and of motoring, or regenerating, mode. However, the DC-link is commonly supplied from a single-quadrant rectifier bridge, i.e. not accepting energy returned from the motor when braking, thus not returned to the AC power supply.

In a modern voltage-source inverter controlled motor drive, the drive is capable of operating in two quadrants of the speed-torque plane. The first quadrant is where both speed and torque are positive. The third quadrant is where both speed and torque are negative. Thus, in those two instances the product (torque×speed) is positive. This is when power flow goes into the mechanical load of the motor. In contrast, the second and fourth quadrants are those where the product (torque×speed) is negative, i.e. when the motor is acting as a generator and power is flowing from the mechanical load through the motor and back into the inverter side of the drive.

The purpose is to obtain a voltage-source inverter that can accept return power flow, i.e. the power can flow back through the inverter to the DC-link capacitor. Where the problem lies is designing an AC/DC converter that can accommodate negative load current. In other words, to a single-quadrant rectifier bridge should be substituted a two-quadrant power converter.

The prior art shows power circuits and control schemes which can be used to obtain two-quadrant power conversion in a voltage-source inverter motor drive. See for instance U.S. Pat. Nos. 4,353,023 and 4,434,393 using an antiparallel regenerative thyristor bridge circuit connected between the inverter and the rectifier through switching transistors fired in synchronism with the thyristors. This approach requires at least six additional thrysitors and associated control, which is a costly solution. A more simple solution has been proposed to deal with the negative flow of power into the DC-link from the inverter, consisting in using a resistor-chopper. This solution, however, because it employs a resistor, is cost effective, but has an adverse impact on efficiency and it causes temperature to rise.

SUMMARY OF THE INVENTION

The invention resides, in the regeneration mode of operation of a motor drive, in creating a current path for the negative DC-link current so as to criss-cross, or invert, current flow from the inverter side into the DC-link, such current path being cyclically interrupted by the effect of a controlled power switch to create a dead time.

More specifically, the controlled power switch is switched for conduction upon each firing of an on-coming main power switch of the AC/DC converter and is being switched OFF before concurrent firing of a subsequent on-coming AC/DC converter main power switch, thereby to allow a dead time for the AC/DC converter in the commutation sequence. Diode means are used to bypass the controlled power switch in the forward power mode of operation of the motor drive, and also in the regeneration mode in preparing for recovery after the controlled power switch has interrupted the current path.

BRIEF DESCRIPTION OF THE DRAWINGS

FIG. 1 shows in block diagram a voltage-source inverter;

FIG. 2 shows the voltage source inverter of FIG. 1 in a prior art embodiment;

FIG. 4A shows the (voltage, current) output domains of the AC/DC converter of FIG. 1, or 2; FIG. 4B shows the (voltage, current) input domains for the DC/AC inverter of FIG. 1, or 2;

DETAILED DESCRIPTION OF THE INVENTION

FIG. 1 shows a voltage-source inverter (VSI) including: 60 Hz AC power supply at the input (phase lines L1, L2, L3) from lines 1; an AC/DC converter CNV rectifying the AC current; a DC-link having a positive terminal TP, a negative terminal TN and a DC-link filter FLT (consisting in an inductor and a capacitor); and a DC/AC inverter INV providing on output lines 2 a variable frequency, constant voltage AC output $V_o$ as controlled by the inverter INV.

FIG. 2 shows the VSI of FIG. 1 in a specific embodiment. The converter CNV is a thyristor bridge mounted across the AC lines (L1, L2, L3) of line voltages (VA, VB, VC) at the standard frequency $f_s$. The DC-link includes a diode $D_o$ across terminals TP, TN, a filter including a reactor L and a capacitor C, the latter across the input lines of the inverter INV. The inverter has three poles, each consisting of two GTO's in series across the DC-link terminals, and antiparallel diodes. GTO1–GTO6 are the GTO's, D1–D6 the associated diodes. From the three poles on lines 2 an AC voltage $V_o$ is derived.

Referring to FIG. 2A, the thrysitors TH1–TH6 are controlled with a firing angle typically of 60°, which leads to a DC voltage $V_{d1}$ between the DC-link terminals. TP and TN. The voltage is $V_{d2}$ across the capacitor C, thus, at the input of the inverter INV. If lines 2 are applied to the stator of an induction motor asserting a torque on a mechanical load, power is derived from the converter in the form of a DC current $I_{L1}$ across the reactor L, and a DC current $I_{L2}$ into the inverter INV. This is known as the "motoring" mode of the motor drive. Power flows back into the mechanical load of the motor. This occurs whether the motor is running in one direction, or the other, while asserting an active torque upon the torque and speed may, thus, be both positive, or both negative. In each instance, the product (torque × speed) is positive. When running in the negative direction (reverse station), the motor is supplied from terminals of the same opposite polarities (TP, TN on FIG. 2), but the inverter is now controlled so that the phase lines 2 exhibit voltage and current vectors rotating in the opposite direction.

Should braking occur, against either direction of rotation, the product of the torque by the speed becomes negative. The motor is now acting as a generator and power is flowing from the mechanical load through the motor and back into the inverter INV. Considering FIG. 2, power can flow back through the inverter to the DC-link capacitor C, but it cannot flow back through the AC/DC converter CNV, because the converter cannot accommodate a negative load current. If the diode $D_o$ is removed, and the polarities of the terminals TP, TN are exchanged, (as shown in FIG. 5) the AC/DC converter will be able to pass power back to its AC side.

Figure 3A:
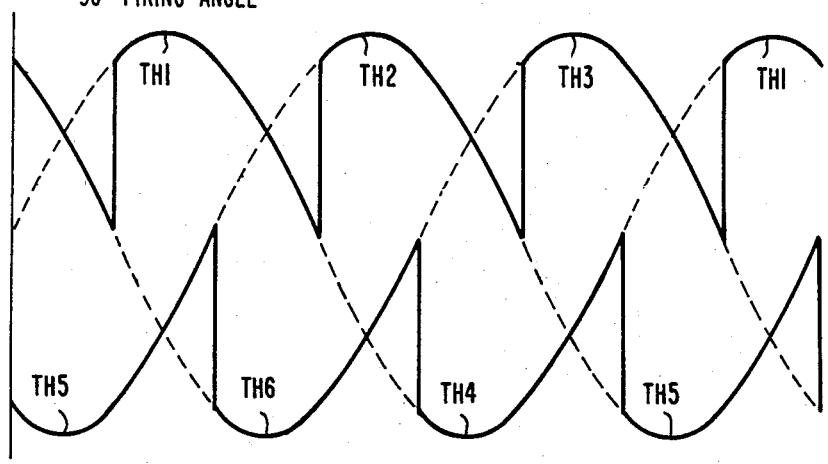
FIGS. 3A, 3B are curves showing the thyristor relationship with the line voltage of the AC/DC converter of FIG. 1, or 2, illustratively for 30° and for 150° firing angles, respectively.
Figure 3B:
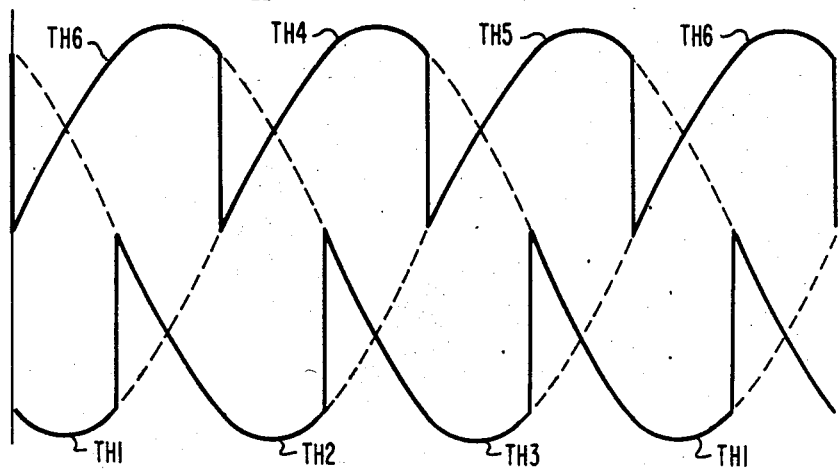

FIG. 3 shows for thyristors (TH1–TH6) control by firing backward in time in order to apply to terminal TP the negative polarity and to terminal TN the positive polarity. This is illustrated in FIG. 3B for a firing angle of 150° as opposed to a firing angle of 30° in the case of FIG. 3A where TP and TN have their original polarities. This is what happens on the AC/DC converter side. On the inverter side, however, the inverter input characteristic requires an unipolar voltage, namely positive, when being forced to pass current in one (motoring) or the other (braking) direction.

FIG. 4A illustrates for the first and second quadrants of the AC/DC converter the (voltage, current) output domains for a two-quadrant operation (diode $D_o$ of FIG. 2 being removed, to allow operation in the quadrant with a positive terminal TN, and a negative terminal TP i.e. $-V_{d1}$. FIG. 4B illustrates for the first and second quadrants the DC/AC inverter input domains for a two-quadrant operation (the polarity of the DC-link terminals TP, TN being the same for both quadrants, the currents being $+I_{L2}$ in the first quadrant, $-I_{L2}$ in the fourth quadrant).

Figure 5:
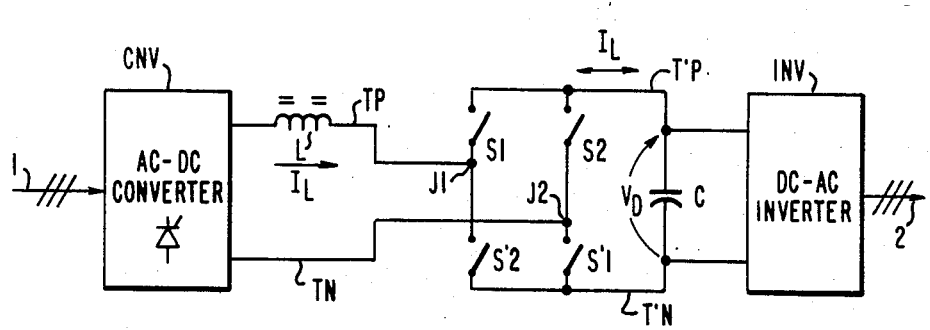
FIG. 5 shows a switching arrangement solution of the prior art to match the output and input domains of FIGS. 4A, 4B.
Figure 6:
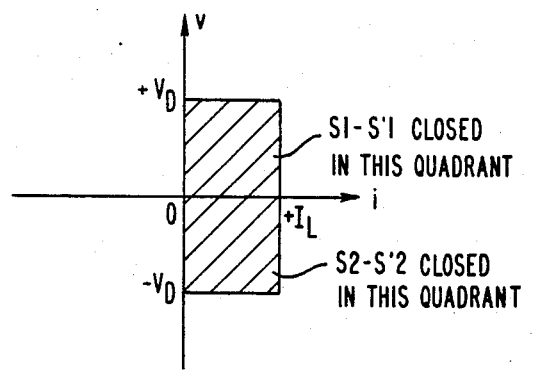
FIG. 6 shows the resulting switch conduction domains as effected with the arrangement of FIG. 5.

In order to overcome the incompatibility between the domains of FIG. 4A and FIG. 4B, FIG. 5 shows a switching arrangement placed in the DC-link to allow the functions at the output of the AC/DC converter to be matched with the input of the DC/AC inverter. As a result, the DC-link terminals (TP, TN) at the output of the AC/DC converter can be either directly connected to terminals T'P and T'N (and the two ends of capacitor C) of the DC/AC inverter, or connected cross-wise thereto. Terminal TP, beyond reactor L, goes to a junction point J1 which, by switch S1, leads to terminal T'P at the input of the inverter and, by switch S'2, leads to terminal T'N at the input of the inverter. Similarly, terminal TN goes to junction point J2 which, by a switch S2, leads to terminal T'P and, by a switch S'1, leads to terminal T'N. When switches S1 and S'1 are closed, while switches S2, S'2 are open, TP is connected to T'P and TN is connected to T'N. This is the normal situation (first quadrant of CNV, and first quadrant of INV). When regenerating, (negative current $-I_{L2}$, and fourth quadrant for INV), the negative voltage is applied upon the AC/DC converter while inverting the connections TP, TN through closed switches S2, S'2 (switches S'1, S1, being open). At the same time, in this case, the AC/DC converter is controlled with a 180° firing angle so as to create a negative voltage at the output of the converter. Accordingly, energy from the inverter (current IL) can flow back to the AC side of the converter. FIG. 6 shows the matched switch conduction domains of the first and second quadrants at the output of converter CNV in response to the operation of the switches of FIG. 5. As explained hereinafter, according to the present invention, a more specific switching arrangement than shown in FIG. 5 is proposed which carry with it several important advantages as will be shown hereinafter.

Figure 7:
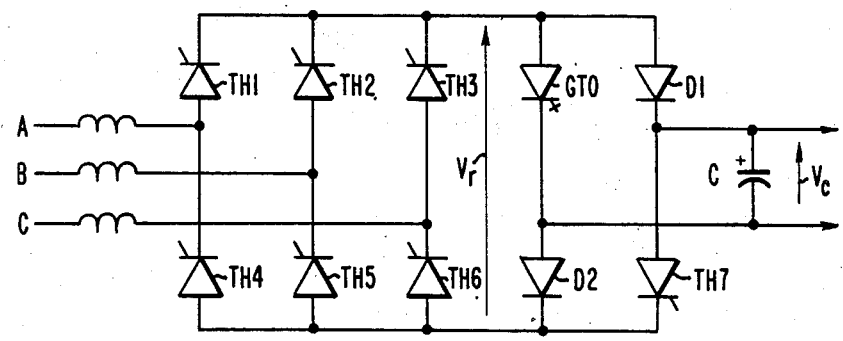
FIG. 7 shows the DC-link of a voltage-source inverter as modified according to the present invention.

Referring to FIG. 7, the switching arrangement used according to the present invention in order to match output and input domains according to FIGS. 5 and 6, is such that one diode D1 and one diode D2 perform the respective functions of S1 and S'1 in the forward power mode; while one GTO device and one thyristor TH7 perform the respective functions of S2 and S'2 in the regeneration mode. The GTO device and thyristor TH7, when controlled for conduction, establish a current path from capacitor C through the DC-link and through the conducting thyristors of the AC/DC converter, while turning OFF diodes D1 and D2. The operation of the circuit of FIG. 7 will be more apparent from a consideration of FIGS. 8, 9A–9C and 10A–10D, hereinafter.

The system has three operating modes:
(a) Pre-charging (FIG. 8)

The devices are triggered strategically to build up the voltage Vc on capacitor C, so as to supply peak value without excessive charging currents. FIG. 8 shows the current paths in the particular situation where TH1 is being fired concurrently with TH5 and TH6. Other combinations are possible, like TH3 and TH4 plus TH5, and so on, or even, by taking the opposite polarity, TH5, for instance, is fired with TH1 and TH3.

Figure 8:
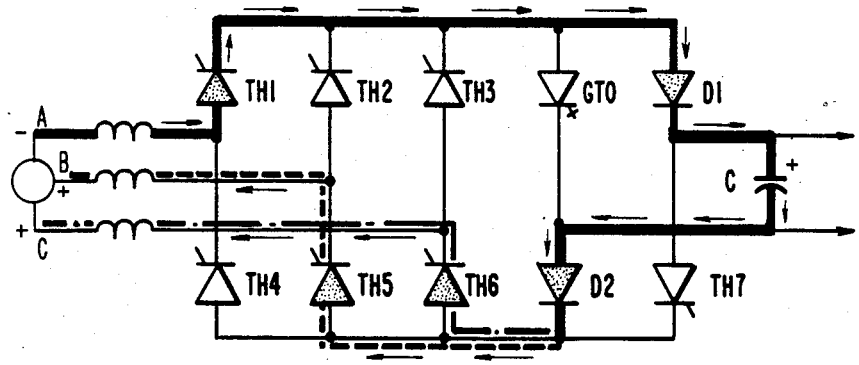
FIG. 8 illustrates the pre-charging operation for the DC-link capacitor in the DC-link of the circuit of FIG. 7.

Having chosen TH1 with TH5 and TH6 as shown in FIG. 8, the firing of all three thyristors can be related to one phase line voltage. Illustratively, the time wave 1a of FIG. 12 as derived from a time wave generator (TWG in FIG. 11B), provides a reference time wave for that purpose. Curve 1a (FIG. 14A) indicates the electrical angles of the line-to-neutral voltage $V_{AN}$ for phase A, at 30° (falling edge) and at 150° (rising edge). A delay angle $\phi$ counted from the falling edge (FIG. 14A) determines when TH1, TH5 and TH6 are being fired. If triggered initially at $\phi=180°$ (or 210° on $V_{AN}$), vector $V_{AN}$ which supports on either sides vectors $V_{AB}$ and $V_{AC}$ for the line-to-line-voltages, will be such at that instant that neither $V_{AB}$, nor $V_{AC}$ as projected on the real axis is positive. Therefore, firing of TH5 and TH6 will not cause conduction to occur (initial instant $t_o$ in FIG. 14A). Thereafter, from cycle to cycle, $\phi$ is reduced slowly and conduction occurs on either TH5 or TH6 with TH1 depending upon vector rotation. This approach to pre-charging with two thyristors (TH5, or TH6, in this combination of three thyristors) has been chosen so that the sequence ABC at the outside of the apparatus (lines 1 into AC/DC converter) does not affect pre-charging. In other words, pre-charging according to FIG. 8 will be effective irrespective of the phase line sequence. Subsequently, while the value of $\phi$ is being reduced, upon each cycle a current pulse of larger magnitude is applied, upon firing, to capacitor C, which is, thus, charged progressively in a pulsated mode until $\phi$ has advanced to 90° (120° on the $V_{AN}$ electrical angle range of FIG. 14A i.e. $\phi_m$). AT this time, capacitor C is fully charged to the peak voltage of the main lines and normal firing of all capacitors TH1-TH6 is allowed in the motoring or in the regenerating mode.

Figure 9A:
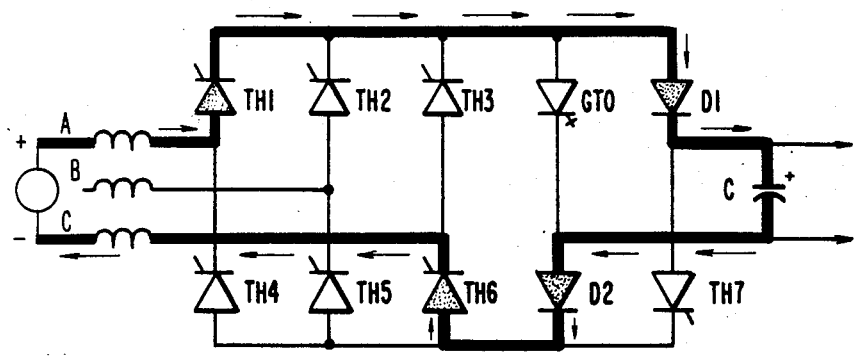
FIGS. 9A, 9B, 9C illustrate the commutation sequence for the voltage-source inverter of FIG. 7 when in the forward power mode.
Figure 9B:
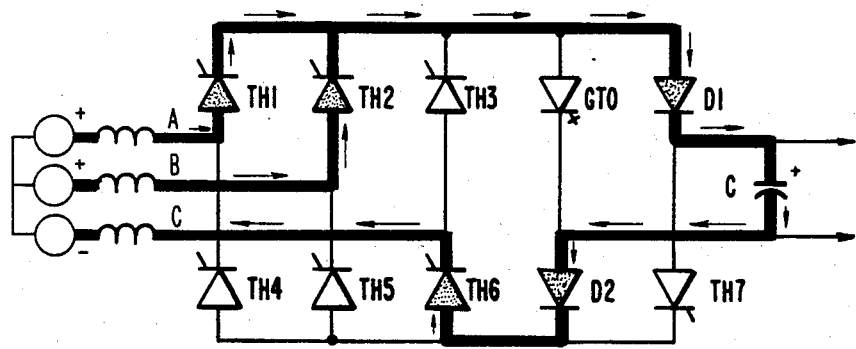
Figure 9C:
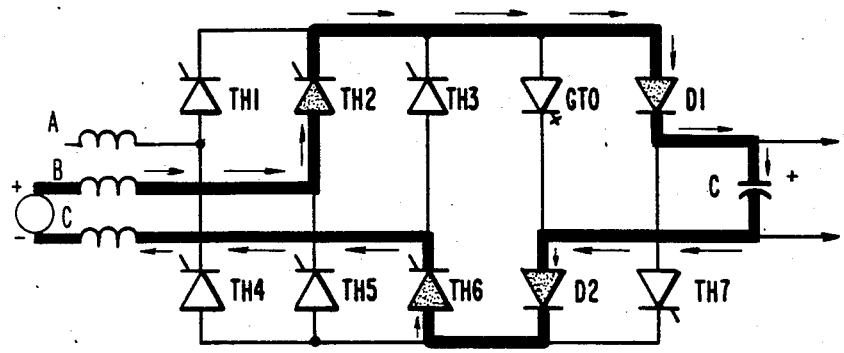

(b) Forward power flow (FIGS. 9A-9C)

The GTO device and thyristor TH7 of FIG. 7 are not turned ON in this mode. Thyristors TH1-TH6 of the converter are sequentially triggered as for a conventional phase-controlled rectifier bridge under maximum positive output voltage, $V_r$. Bridge current is passed to the DC-link via diodes D1, D2, thus, normally delivering energy to capacitor C. FIGS. 9A, 9B, 9C illustrate a typical natural commutation sequence between oncoming and off-going thyristors, for instance, from thyrsitor TH1 to thyristor TH2 in relation to thyristor TH6, in this mode of operation. FIG. 9B shows the intermediate stage when TH1 and TH2 are sharing current, while TH1 is phasing out and TH2 is taking over. Current flow is limited by the combined action of the AC supply inductances and the DC-link capacitor C.

(c) Regeneration (FIGS. 10A-10D)

In this mode, with a firing sequence at 180° of the forward power mode firing sequence, pairs of thyristors in the TH1-TH6 bridge are concurrently fired at a firing angle chosen along the line of FIG. 3B, but at 180° so as to produce maximum negative output voltage $V_r$. According to the present invention, current is steered from the DC-link via a GTO device and an auxiliary thyristor TH7, (diodes D1, D2 are reverse biased by $V_c$) thus removing energy from the capacitor and returning it to the mains through inverted polarity terminals as earlier stated. A typical commutation sequence for this mode is illustrated. Following the steering operation performed by the GTO device and TH7, with concurrently filed thyristors TH6 and TH1, the commutation is initiated by turning OFF the GTO device (FIG. 10B). Load current is now diverted to diode D1 and through thyristor TH7 and the terminal voltage $V_r$ drops to approximately zero. The free-wheeling current through diode D1 and auxiliary thyristors TH7 is supported by the supply line inductances, but is rapidly forced to zero by the negative supply voltage returning the inductive energy to the mains. After the current is extinguished (FIG. 10C), a recovery time is allowed to lapse. Then, the GTO device and auxiliary thyristor, TH7 are again triggered concurrently with the "next" pair to be fired in the TH1-TH6 sequence, namely now TH6 and TH2.

It is important to note that this method of commutation is highly reliable, in contrast to a natural bridge commutation in inversion. Typically, the supply voltage is in the region of a negative peak (around 300 degrees) when the commutation is initiated, thereby to allow approximately 60 degrees of commutation margin angle. Current flow is again regulated by the combined action of the capacitance C and the supply line inductances. The maximum output voltage, in this mode, is somewhat less than the maximum possible in the forward power mode, because of the dead time following the GTO device turn-OFF (FIG. 10C).

Figure 11A:
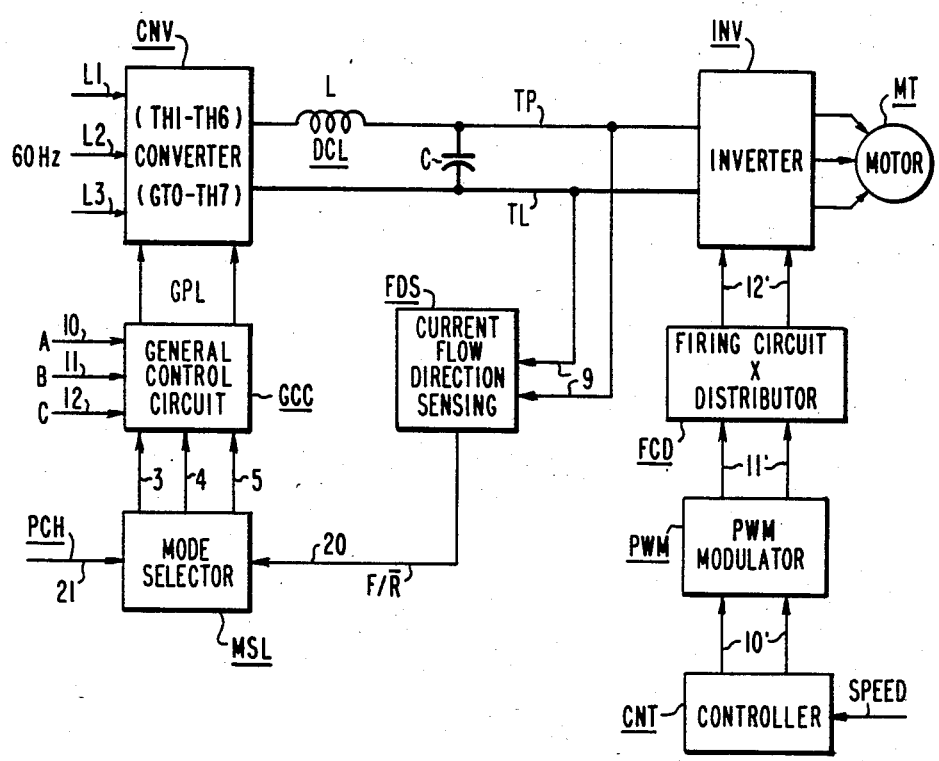
FIGS. 11A, 11B and 11C show in block diagram a gating control system as can be used for effecting the operative steps of FIGS. 8, 9A, 9B, 9C, 10A, 10B, 10C and 10D.
Figure 11B:
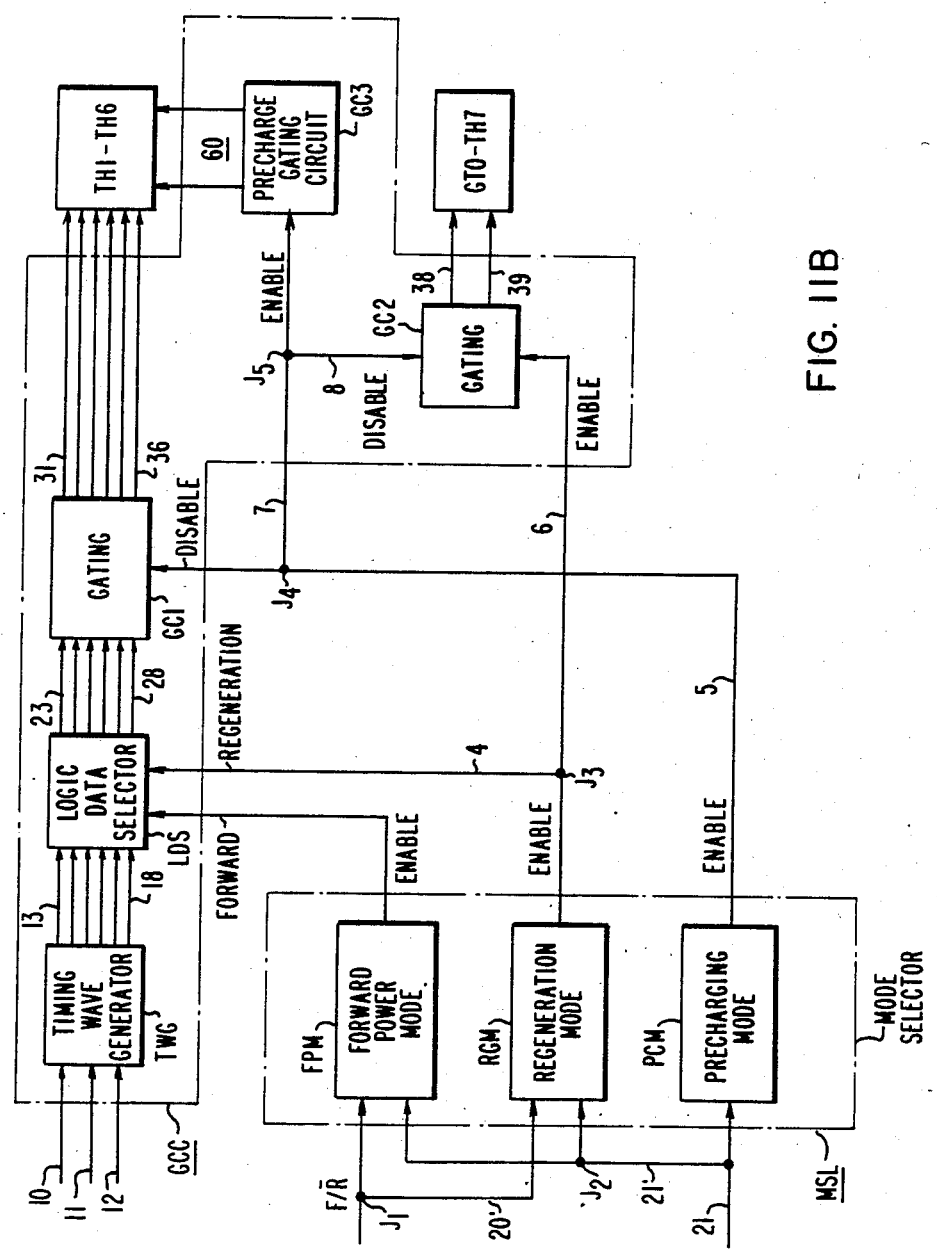
Figure 11C:
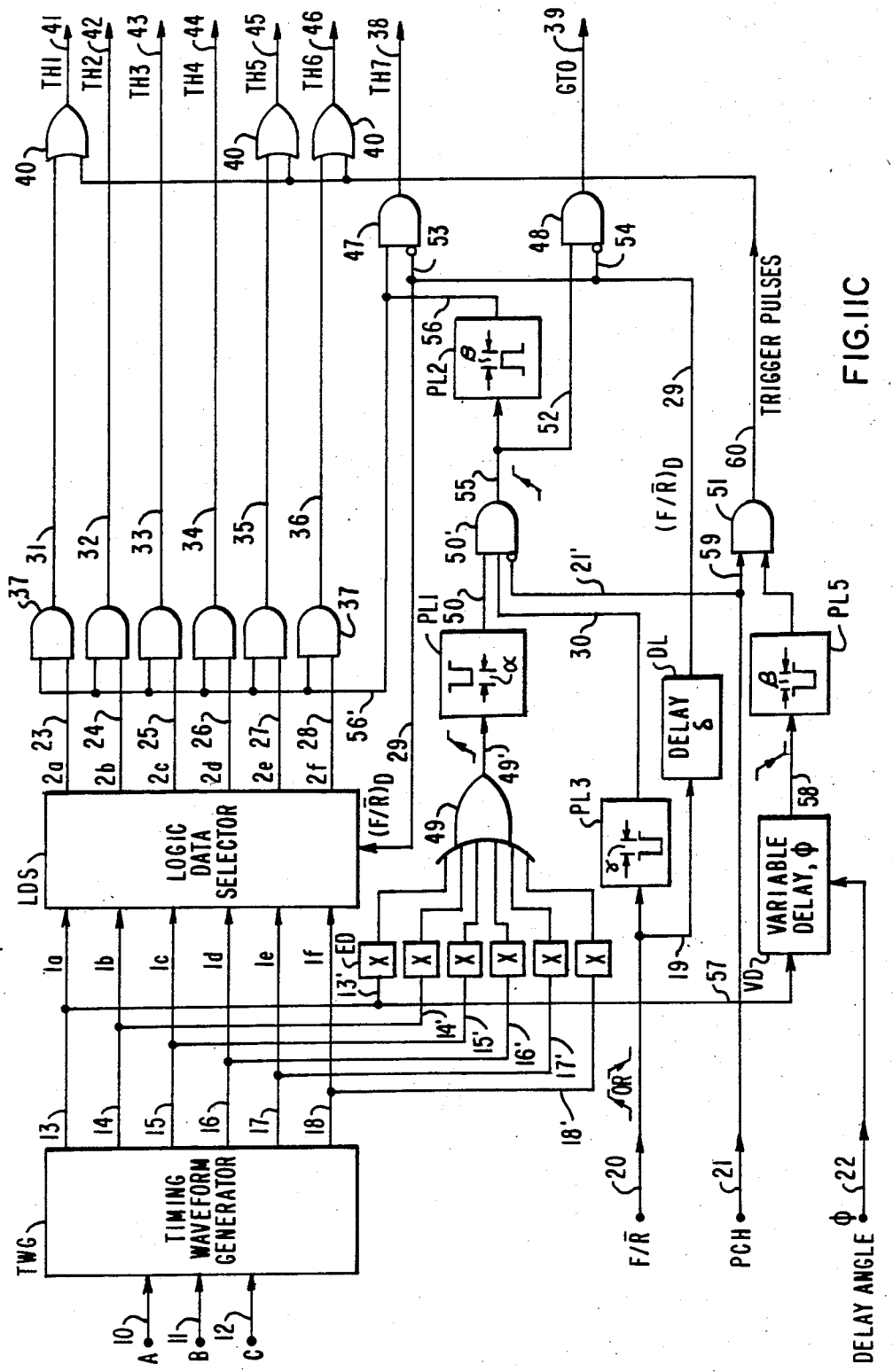

Gating control system (FIGS. 11A, 11B, and 11C)

Referring to FIG. 11A, converter CNV includes, besides the six thyristors TH1-TH6, one GTO device and one auxiliary thyristor TH7 connected as shown in FIG. 7, together with diodes D1 and D2. FIG. 7 shows that diode D1 is operatively connected from the positive terminal TP to the positive end of capacitor C, whereas diode D2 is oriented from the negative end of capacitor C to the negative terminal TN. The GTO is serially connected between terminal TP and the positive end of diode D2, while the auxiliary thyristor TH7 is connected between the negative end of diode D1 and the negative terminal TN. A general control circuit GCC is associated with the controlled switches of the converter which is capable of operating in each of three modes, namely a forward power mode, a regeneration mode and a pre-charging mode. A mode selector MSL is triggered into a appropriate mode selection by a pre-charging signal PCH on line 21, a forward power mode signal F as a ONE on line 20 or a regeneration mode signal R as an O on line 20. The status of line 20 depends upon whether a current flow direction sensing detector FDS has detected on line 9 that the voltage Vc upon capacitor C in the DC-link DCL has its normal value, or that it has increased substantially. The latter situation indicates that, due to braking, the inverter is charging capacitor C above its normal level.

The inverter is shown, illustratively, controlled by a pulse-width modulator PWM responding to the control signals of lines 10' from a controller CNT, and applying by lines 11' a firing control pattern to the firing circuit and distributor FCD which controls the conduction in sequence and duration for the thyristors of the inverter INV, as generally know. FIG. 11A, also shows the combination converter-inverter as part of a motor drive including an AC motor MT connected at the output of the inverter.

The invention pertains to control of the converter CNV in two situations: when the motor is driving forward (motoring in either direction) and when, during braking, motor MT under load is regenerating through the inverter and the DC-link into the converter CNV.

Referring to FIG. 11B, the mode selector MSL is shown to include three blocks characterizing the selected mode, namely the pre-charging mode PCM, the regeneration mode RGM, or the forward power mode FPM. The general control circuit GCC includes a time wave generator TWG providing, in response to the three voltage signals A, B, C of lines 10, 11, 12 (characterizing the phase line voltages on L1, L2, L3 at the input of the converter) six timing waves to appear on lines 13 to 18. The six timing waves are used to establish the conducting time intervals of the six thyristors TH1-TH6 in the order of firing of the converter, namely, as ordered by the gating circuit GC1 of FIG. 11B. When passing from the forward power mode to the regeneration mode (as shown in FIG. 11C) the order of the timing waves is rearranged so as to produce a 180° phase shift in the firing of the thyristors and, conversely, when returning to the motoring mode. This is accomplished with a logic data selector LDS controlled by line 3 from the forward power mode block FPM to provide on lines 23 to 28 six timing waves which have an order corresponding to the forward power mode when the motor is motoring. Logic data selector LDS is controlled by line 4 to provide a different order of the timing waves to appear on lines 23 to 28, which corresponds to the regeneration mode when the motor is regenerating. Line 4 responds to the selection made by regeneration block RGM in this case. The choice between line 3, or line 4, depends upon the status of lines 20 and 20' from junction point J1. From lines 23-28 the control signals go to the gating channels of the gating circuit GC1. The outputted gating pulses 31-36 are applied to the respective thyristors TH1-TH6 in sequential order under firing angles allocated by logic data selector LDS in accordance with line 3, or 4.

Figure 10A:
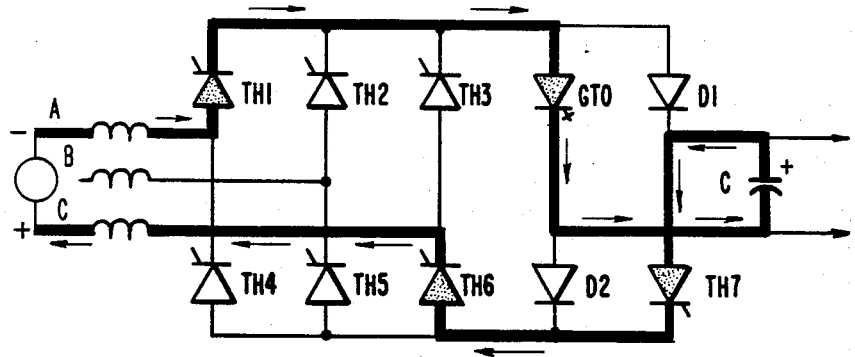
FIGS. 10A, 10B, 10C and 10D show the commutation sequence for the voltage source inverter of FIG. 7 when in the regeneration mode.
Figure 10B:
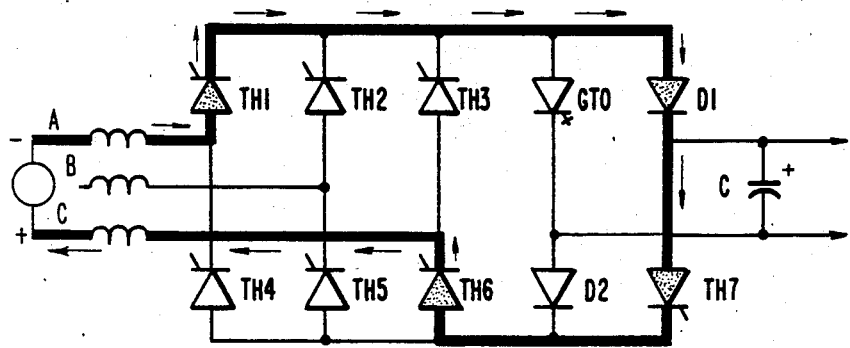
Figure 10C:
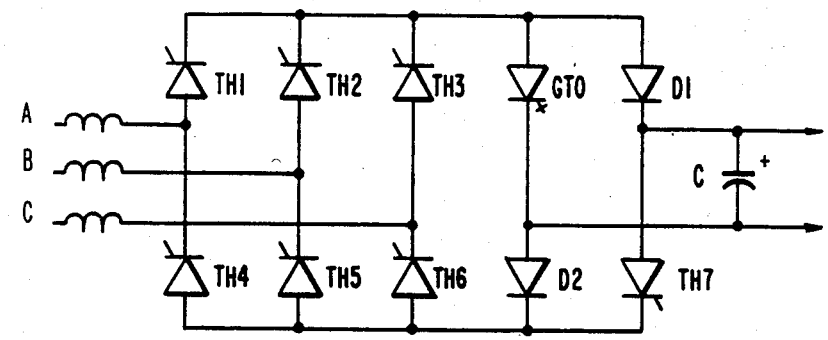
Figure 10D:
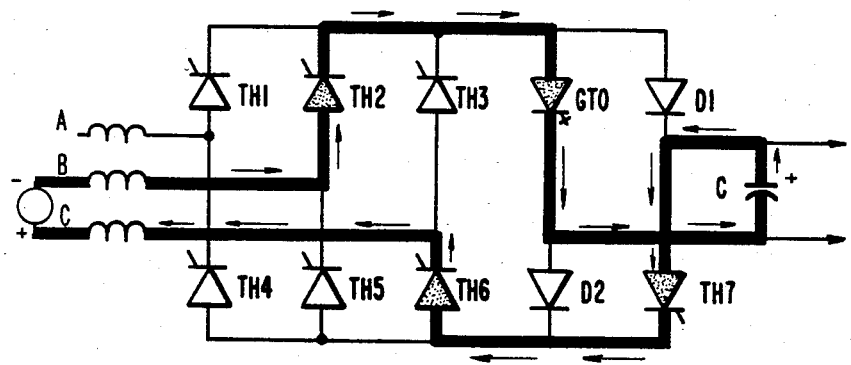

In the regeneration mode, as shown by FIGS. 10A, 10B and 10D, the GTO device and the auxiliary thyristor TH7 are used. This function is illustrated in FIG. 11B by line 6 coming from line 4, after junction point J3, which enables a gating circuit GC2 outputting by line 39 gating pulses for the GTO and outputting by line 38 gating pulses for the auxiliary thyristor TH7. When in the Forward Power Mode, line 6 disables the operation of the gating circuit GC2.

As earlier explained by reference to FIG. 8, there is a need for pre-charging the capacitor C, initially. This is effected, as shown by controlling specific main thyristors of the converter CNV, while using the diodes D1 and D2 provided as shown in FIG. 7. This method will be explained in detail hereinafter. FIG. 11B shows that upon a proper signal PCH on line 21, by lines 21' the Forward Power Mode and Regeneration mode are disabled while, by lines 5 and 7 coming from the pre-charging mode block a pre-charge gating circuit GC3 is enabled to apply by lines 60 firing pulses on the selected thyristors of the converter. At the same time, gating by gating circuit GC1 is disabled (for instance by line 5 beyond junction point J4 to the gating circuit GC1) and also gating by gating circuit GC2 is disabled (illustrated by line 8 from junction point J5 on line 7).

Referring to FIG. 11C an implementation of the circuit of FIG. 11B is illustrated. The logic data selector responds to timing waves (1a-1f), shown in FIG. 12, received on lines 14-18 in this order. Depending upon whether F/R̄ on line 20, or rather on line 29 as explained hereinafter, is a 1, or a 0, the outputted sequence of the timing waves will be according to the following table of truth:

| (F/R̄$_D$) | 1  | 0  |
|-----------|----|----|
| 2a        | 1a | 1d |
| 2b        | 1b | 1e |
| 2c        | 1c | 1f |
| 2d        | 1d | 1a |
| 2e        | 1e | 1b |
| 2f        | 1f | 1c |

These will be outputted on lines 23-28, respectively.

The operation of the logic data selector, under the signal F/R̄ of line 20 in either modes, of the firing signals of lines 41-46 to the main thyristors TH1-TH6, of lines 38 to TH7, of line 39 to the GTO, the operation of the pre-charge signal PCH of line 21, are all conditioned by pulses of given duration and by time delays which are required for the proper commutation of the devices according to FIG. 8, FIGS. 9A-9C and FIGS. 10A-10D, as will be now explained by reference to FIGS. 11C and 12.

Figure 12:
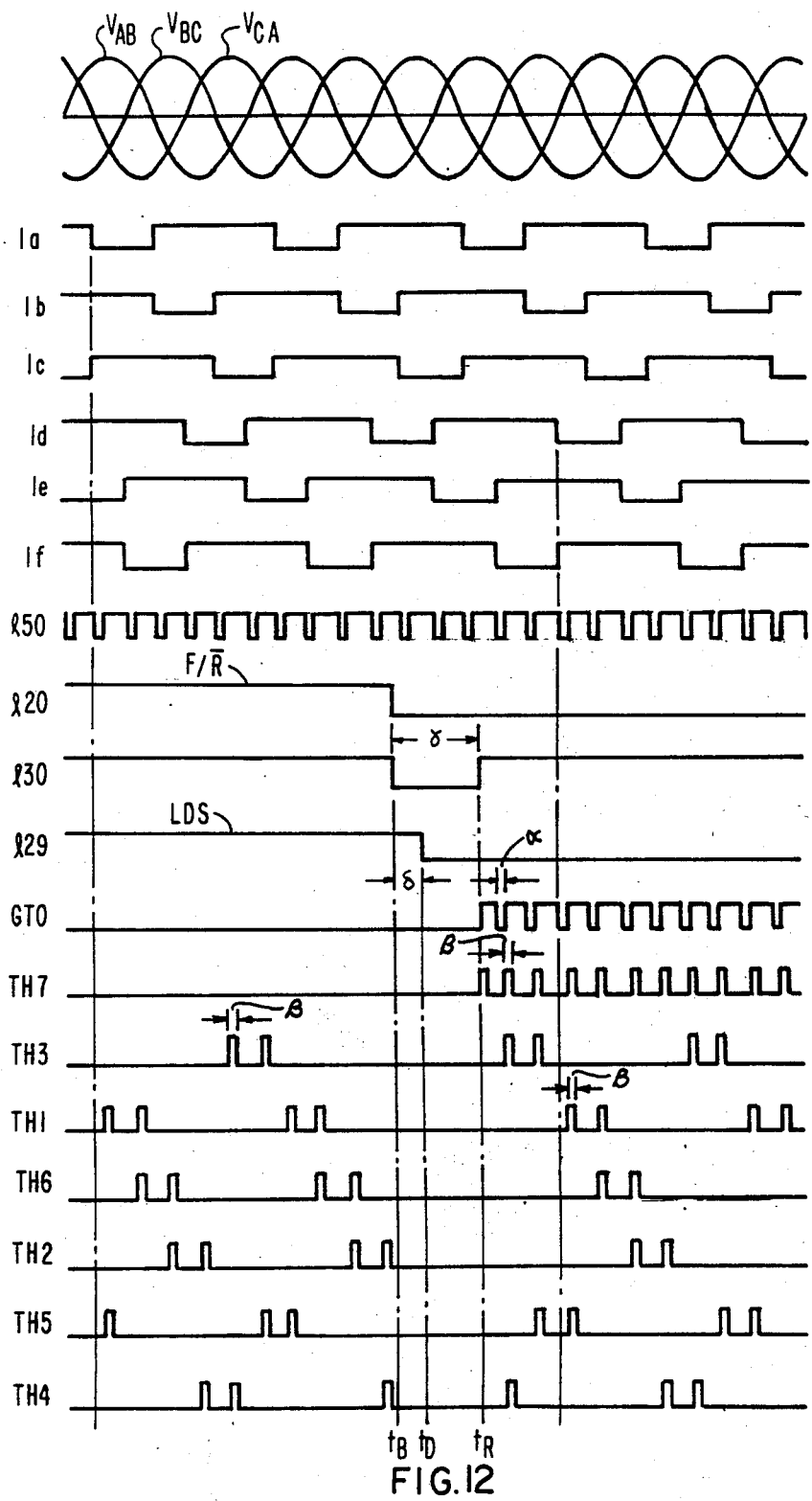
FIG. 12 shows curves which indicte the timing waveforms, the mode selecting signals and the gating pulses used in the gating control system of FIG. 11C.

Using the falling edges of the respective timing waves 1a-1f of lines 13-18, edge detectors ED respond to lines 13'-18' and derive via OR device 49, on line 49', a signal which triggers pulse generator PL1 so as to generate on line 50 a notch of duration $\alpha$, as shown in FIG. 12 for line 50. These notches like the falling edges of 1a-1f follow each other at 60° apart. It is observed that the falling edge of 1a (for instance) is occurring at 30° electrical angle of the voltage-to-neutral voltage $V_{AN}$, the rising edge thereof occurring at 150° electrical angle.

Assuming the system is initially in the forward power mode, asynchronously, the signal of line 20 (F/R̄) may fall from a ONE to a ZERO at the time $T_B$ of detection (on line 9 in FIG. 11A) of braking, as shown in FIG. 12. A pulse generate PL3 is triggered from line 30 to generated a notch of duration $\gamma$, as shown in FIGS. 11C and 12. Assuming there is no pre-charging, due to the logic insertion at the input of device 50', the signal of lines 21 and 21' will have no effect on the AND device 50' at this time. Therefore, until the time interval $\gamma$ has lapsed, the pulse signal of duration $\alpha$ of line 50 will not be translated onto lines 55 and 52.

Returning for a moment to what precedes instant $t_B$, the signal of line 50, except for the duration $\alpha$ due to DL1, adds up with the signal of line 30 to provide a "high" on lines 50 and 30. Nothing occurs on lines 52 and 56. The falling edge of the signal of line 20 goes by line 19 to a delay line DL and incurs a delay $\delta$, to appear on line 29. Before instant $T_D$ by line 29 and the inverted inputs 53, 54 to AND devices 47, 48, a blocking signal for the control of auxiliary thyristor TH7 and the GTO device is effective so that, while being in the forward power mode, no gating will be possible for TH7 and the GTO device until instant $t_D$. As already mentioned, operation of TH7 and the GTO is further blocked by the delay $\gamma$, on line 30, which causes a "zero" to appear on line 30 until time $t_R$.

Considering the effect of the falling edge on line 29 at time $T_D$, it is observed that line 29 controls the transfer characteristic of the logic data selector LDS. Therefore, it is at instant $T_D$ that the firing angle of TH1-TH6 is changed. As shown by the table of truth, after F/R̄ has become ZERO and time γ has lapsed, (on line 29) the order of the time waves 1a-1f of FIG. 12, becomes such that thyristors TH1-TH6 are now going to be fired with a 180° phase shift, as shown in FIG. 12 beyond time $T_R$. This is shown in FIGS. 9A-9C and 10A-10D for the purpose of illustration for thyristors TH6, TH1, and TH2. From FIG. 12 it appears that at time $T_R$ (γ expired), AND device 50' sends on line 52 the notched signal of line 50 and triggers trigger pulse generator PL2 to generate a firing pulse of duration β. This firing pulse goes to thyristor TH7 by line 56 and AND device 47 (gating circuit GC2), whereas by line 56' and AND devices 37 (gating circuit GC1) the thyristors TH1-TH6 are fired sequentially in accordance with the firing angle prescribed by the logic data selector LDS (2a-2f) thus, in accordance with the regeneration mode (line 29). The controlled switch GTO according to the present invention, is triggered for the first time at $T_R$ and also the auxiliary thyristor TH7. Then, notch γ causes an interruption of the GTO (thus causing the occurrence of a dead time as shown by FIG. 10C). Upon retriggering of the GTO device, TH7 is concurrently fired. It appears that the change of the firing angle by LDS regarding the main thyristors, when changing mode at $t_B$, has been retarded by a duration δ, thereby giving any pulse which could have been triggered time to die out before being able, as shown in FIG. 10A, to trigger firing in the regeneration mode. δ is larger than β. This is important, since a change of firing angle might cause a short to occur between thyristors of the same pole across the DC- link, thus, resulting in a short between the main lines, either on the converter side, or on the inverter side.

In addition, before starting the GTO device and the auxiliary thyristor TH7, the full time γ must lapse, since the existing currents must be given time to decay to zero, plus additional recovery time for the main thyristors.

Considering the pulse of duration α generated by DL1 on line 50, when time interval γ has expired and line 30 becomes a ONE, after instant $T_R$, and there is a ONE on line 50, the signal passes on line 52 to gate the GTO. Time α will lapse thereafter (if not before), and, by pulse generator DL2, a ONE signal is built-up (from the rising edge of the signal of line 55) havign a duration β, which is a pulse signal carried by line 56 over AND device 47 (which allows it since time interval δ on line 29 has expired). Therefore, on line 39, thyristor TH7 is fired. Thus, upon every 1/6 cycle of the main, the GTO device and the auxiliary thyristor TH7 will be controlled as shown in FIG. 12, namely, the GTO is turned ON, then turned OFF for a duration α, and TH7 is triggered by a pulse of duration β. It appears, as shown by FIGS. 10A-10D, that during the time interval α that the GTO is OFF, there is time for the circuit to settle and the currents to decay to zero in the entire circuit as shown by FIG. 10C. Following that recovery time (α being chosen long enough to allow it to occur) the GTO is fired again in relation to the "next" main thrysitors of the converter coming to be turned ON, as shown in FIG. 10D. At the same time, by line 56', selected pairs of thryistors TH1-TH6 will be triggered by the firing pulse β.

FIG. 11C is a schematic diagram of a gating control system for the voltage source inverter according to the invention. The organization is such as to ensure safe transition from one operating mode to another. Several timing pulses (α, β, γ) and delays (δ, φ) are shown. These are defined as follows:

α: Recovery (dead) time required in regeneration. (A typical value of α is 400 to 500 microseconds.)

β: Trigger pulse width. (A typical value of β is 200 microseconds.)

γ: Time corresponding to approximately 90° at supply frequency. Required in going from forward power to regeneration to ensure that current is extinguished and devices have recovered before enabling the new mode. (A typical value of γ is 5 milliseconds.)

δ: Delay greater than β, but less than γ. (A typical value of δ is 2.5 milliseconds.)

φ: Variable delay time characterizing pre-charge phase delay angle.

In FIG. 11C a Timing Waveform Generator block TWG is shown which encodes the instantaneous supply voltages vAB; vBC; VCA into six logic signals (1a-1b) used as timing waves for the firing angles by the control system. FIG. 12 shows the relationship between these timing signals and the line-to-line supply voltages $V_{AB}$, $V_{BC}$, $V_{CA}$ for the positive phase sequence. Circuits can be devised to generate the correct timing signals irrespective of the phase sequence.

FIG. 11C also shows the implementation of the pre-charging mode from line 21 with a variable delay time φ ranging from 180° to 90° which is imposed by a signal derived from line 22 and enforced by a variable time delay device VD responsive to the falling edge of time waveform $t_a$ of line 13, as carried over by line 57. As a result, on line 58 appears the timing wave 1a, but retarded by φ degrees. The falling edge thereof triggers by line 58 a pulse generator PL5 to generate firing pulses of duration β which are outputted by AND device 51, when in the pre-charge mode (lines 29 and 59). The firing pulses appear on line 60 and are applied to selected OR devices 40, for TH1, TH5 and TH6 in the illustration (as earlier explained by reference to FIG. 8). The pulses of line 60 appear upon each cycle (timing wave of lione 58) with a delay angle φ which is progressively reduced, from 180° initially to 90° at $t_f$ by circuit VD.

When in the pre-charging mode, line 21' from line 21 is applied with an inversion of logic at the input of AND device 50' so as to block the forward power, or the regeneration mode, effect on lines 30.

The operation in the regeneration mode will be explained hereinafter by reference to the curves of FIGS. 14A and 14B.

Figure 13A:
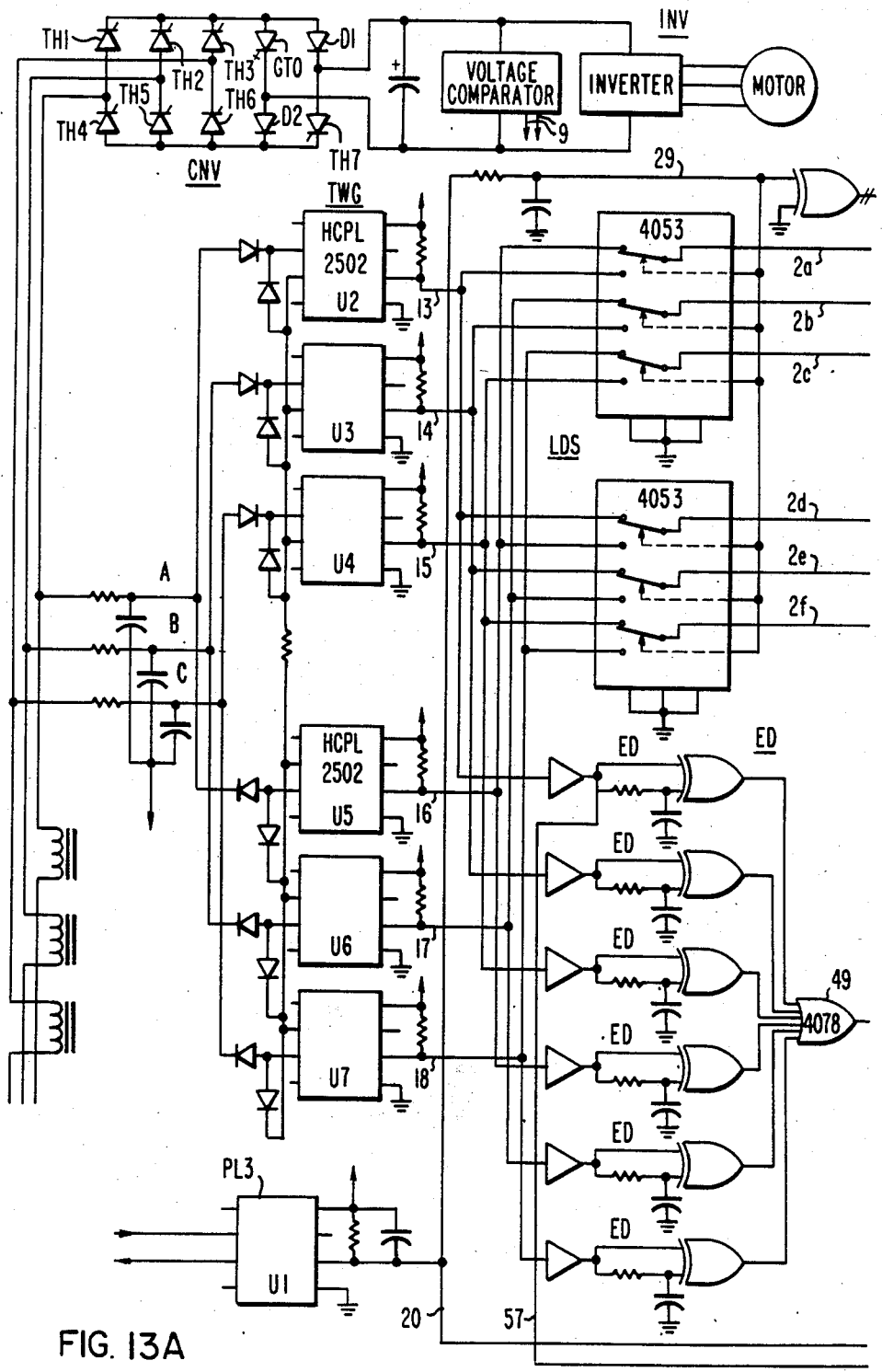
FIGS. 13A and 13B show a solid state implementation of the gating control system for the regenerative DC-link power circuit of FIGS. 7 and 11C.
Figure 13B:
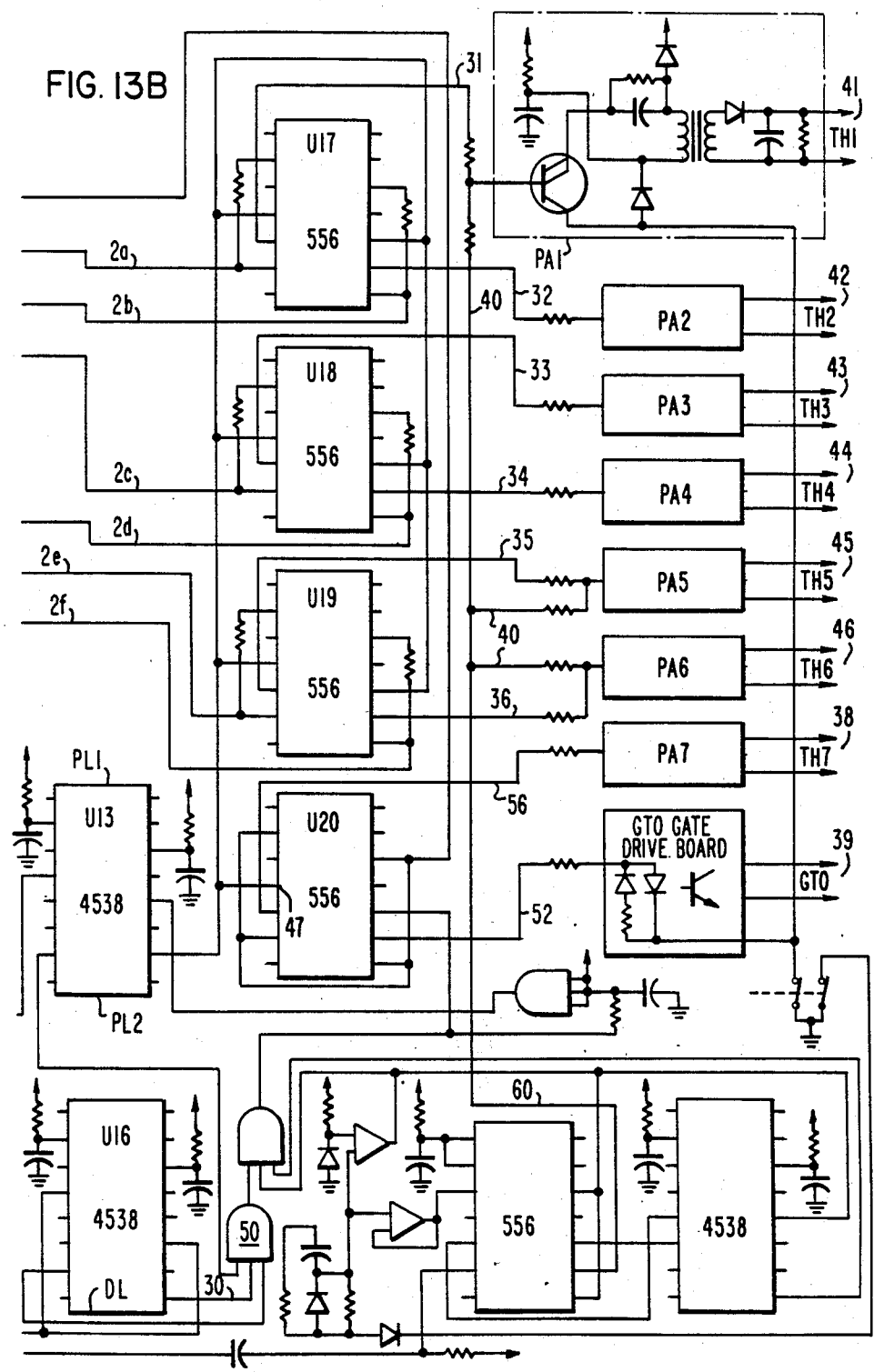

FIGS. 13A, 13B show a solid state implementation of the circuit of FIG. 11C. Whenever possible reference numerals matching lines and devices in the circuit of FIG. 11C have been indicated in FIGS. 13A-13B. Therefore, understanding of the organization and functions of the various portions of the circuit of FIGS. 13A-13B is straight forward. The nature of the key solid state devices in the circuit is recognized from FIG. 11C and from FIGS. 13A-13B. They have known characteristics as follows:

4053 = CMOS TRIPLE POLE SWITCHING ELEMENT

U1-U7 = HCPL 2502 = OPTICAL COUPLER

U13 = 4538 = MONOSTABLE PULSE GENERATOR

U17-U20=556=DUAL TIMER

PA1-PA7=PULSE AMPLIFIER CIRCUIT

Figure 14A:
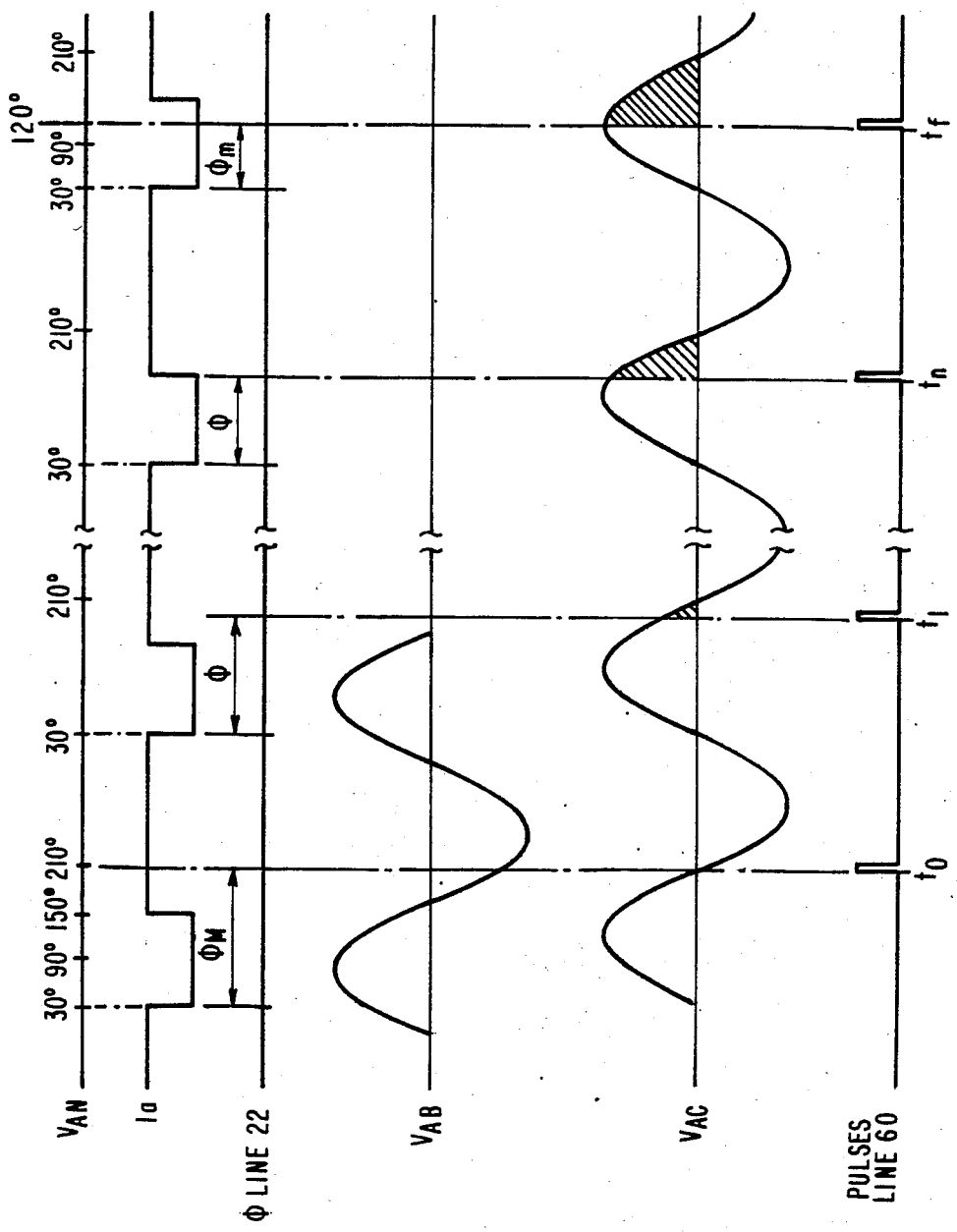
FIGS. 14A and 14B are curves illustrating the gating control system operation in the pre-charging mode as for FIG. 8.
Figure 14B:
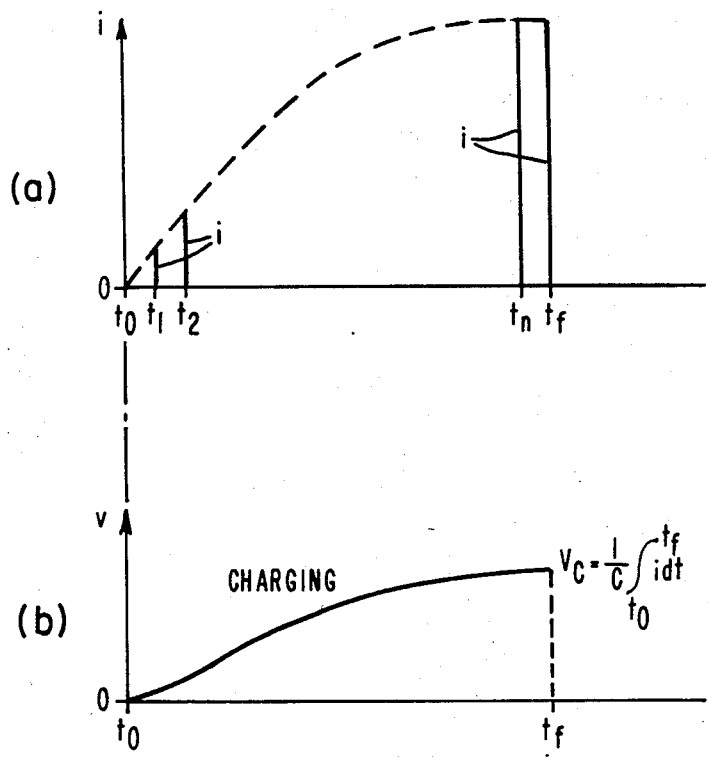

Referring to FIGS. 14A-14B and to FIG. 8, the pre-charging mode will now be explained.

As explained earlier by reference to FIG. 8, pre-charging must be started under such vectorial orientation of the three vectors involved with the three selected thyristors (TH1, TH5 and TH6 in the example) that when one thyristor can be fired (positive voltage $V_{An}$) none of the two others ($V_{AB}$, $V_{AC}$ which determines the conduction), is under positive voltage. When this is done, irrespective of the sense of rotation, thus, of the sequence of the phase lines (A, B, C) pre-charging will be possible under the firing pulses from line 60. In order to achieve such initial condition, choosing as timing wave 1a (FIG. 14A) firing will be done with the additional delay $\phi_m$ such that firing occurs at 210°. With $V_{AN}$ at 210°, none of the $V_{AB}$ and $V_{AC}$ is positive.

Referring to FIG. 14A, the value of the variable delay $\phi$ (line 22 on FIG. 11C), which is the firing delay angle added to the falling edge of 1a (line 57 in FIG. 11C). Since $\phi=180°$ initially, actual firing from the falling edge of $t_a$ will be initially as high as 210° (30° plus 180°). Under such situation (FIG. 14B), at instant $t_o$, firing occurs upon the zero- crossing, or nearly, of the $V_{AC}$ curve. At the next cycle, $\phi$ has been reduced somewhat and firing occurs with less retardation as shown at $t_1$. And so on upon each cycle. By line 60 and OR devices 40, firings take place upon each cycle with less retardation ($\phi$) upon TH1, TH5 and TH6 (instants $t_n$). Finally at instant $t_f$ the value of $\phi$ is such that $\phi=\phi_M=90°$ and firing now occurs upon the maximum voltage $V_{AC}$ at 120° on the waveform) as applied to the thyristors, therefore providing maximum voltage to capacitor C.

FIG. 14B shows, under (a), successive increased charging currents applied upon each pre-charging pulse to the capacitor and, and under (b), the integrated value of Vc which increases from the initial instant of pre-charging $t_o$ to the full charge at instant $t_f$. This pulsated mode of pre-charging prevents the full input voltage from being applied suddenly to the capacitor, which would cause surges of currents and voltages which could harm the circuitry.

Operation of the system requires the input of several control signals. In the pre-charge mode, PRE-CHARGE is set "true" and the delay time, $\phi$, is slowly decreased from its initial value. In normal running, PRE-CHARGE is set "false" and the FORWARD/REGEN (F/R) control is determined by detecting the capacitor voltage, $V_c$, and comparing it with a defined threshold using suitable hysteresis. The detection of a high voltage condition calls for REGEN and the detection of a low voltage condition prescribes FORWARD. The invention has been described with the use of a GTO together with the auxiliary thyristor TH7. It is understood, however, that any device which can be triggered for conduction and triggered for non-conduction, for instance a transistor, will do in place of the GTO device.

We claim:

1. A method of pre-charging from three-phase AC input lines the DC-link capacitor of a constant voltage voltage-source inverter including: DC terminals connected to the input of the inverter; a DC-link capacitor across said DC terminals; a bridge of thyristors connected between respective one of said AC input lines and respective ones of said DC-link terminals; comprising the steps of:
    firing one of said thyristors which is associated with one of said DC terminals and firing two of said thyristors which are associated with the other of said DC terminals in normal bridge sequential firing;
    the operative firing angle of said one and two thyristors being retarded by a predetermined delay angle;
    said delay angle being initially such that the AC voltage applied by said AC input lines to said one and two thyristors is substantially at zero-crossing; and
    repeating such firing step upon each cycle of said applied voltage while decreasing said delay angle progressively with each cycle until said operative firing angle is reached, thereby applying maximum voltage to said DC-link capacitor.

2. The method of claim 1 with diode means being interposed between said DC-link capacitor and said thyristor bridge.

3. The apparatus of claim 2 with said first predetermined time interval being long enough to allow complete recovery of said AC/DC converter, and of said auxiliary thyristor device.

4. The apparatus of claim 3 with said GTO switch being controlled for conduction concurrently with said operative main thyristors.

5. The apparatus of claim 4 with the firing angle of said operative main thyristors being controlled with one selected value when in the forward power mode and another selected value when in the regenerating mode, transfer from the forward power mode to the regenerating mode being effected after a second predetermined time interval initiated by the detection of motor braking.

6. The apparatus of claim 5 including a voltage detector for providing an indication of a critical DC-link voltage change across said DC terminals characteristic of regeneration from said inverter; said transfer being effected in response to detection of said critical DC-link voltage change.

7. The apparatus of claim 6 with initial control for conduction of said GTO device in the regenerating mode being postponed following said detection of a critical DC-link voltage change until a third time interval has expired.

8. The apparatus of claim 7 with said third time interval being larger than said second time interval.

9. In an AC motor drive system including:
    (a) an AC/DC rectifier having AC input lines, opposite poles, main thyristors forming a bridge across said AC input lines and said poles; (b) a precharged DC-link capacitor across said poles; an inverter having AC output lines, and DC terminals connecting said DC-link capacitor to the inverter and (c) an AC motor supplied by said AC output lines;
    with first and second diode means operatively connected each between a corresponding pole of said thyristor bridge and an associated end of said DC-link capacitor for providing a current path between conducting main thyristors when the motor drive system is operating in the forward power mode;
    with additional first and second static switches cross-coupled between respective ends of said DC-link capacitor and respective poles of said thyristor bridge;

with means for controlling said first and second additional static switches when the motor drive system is in the regenerative mode for bypassing said first and second diode means and for passing said current path through said DC-link capacitor in the opposite direction, thereby to allow energy feedback from said DC terminals through said rectifier onto said AC input lines;

the combination of:

one GTO device as one of said first and second additional switches and an auxiliary thyristor as the other of said first and second additional switches; whereby one of said first and second diode means is bypassed by said GTO device and the other of said first and second diode means is bypassed by said auxiliary thyristor when said GTO device and auxiliary thyristor are conducting;

with said controlling means being operative in the regenerative mode concurrently with the thyristor bridge to control conduction of said GTO device and additional thyristor;

said GTO device being controlled thereafter for nonconduction during a first predetermined time interval of duration sufficient to allow decay of the current path through the operative main thyristor switches, through said auxiliary thyristor and said bypassed one of said first and second diode means.

* * * * *

UNITED STATES PATENT AND TRADEMARK OFFICE
CERTIFICATE OF CORRECTION

PATENT NO. : 4,697,131

DATED : September 29, 1987

INVENTOR(S) : Colin D. Schauder; Theodore M. Heinrich

It is certified that error appears in the above-identified patent and that said Letters Patent is hereby corrected as shown below:

Column 12, line 22 (Claim 3, line 1), cancel "claim 2" and substitute -- claim 9 --.

Signed and Sealed this

Sixth Day of September, 1988

Attest:

DONALD J. QUIGG

Attesting Officer

Commissioner of Patents and Trademarks